United States Patent [19]

Okamoto

[11] Patent Number: 5,291,615
[45] Date of Patent: Mar. 1, 1994

[54] INSTRUCTION PIPELINE MICROPROCESSOR

[75] Inventor: Kosei Okamoto, Kunitachi, Japan

[73] Assignee: Kabushiki Kaisha Toshiba, Kawasaki, Japan

[21] Appl. No.: 974,328

[22] Filed: Nov. 10, 1992

Related U.S. Application Data

[63] Continuation of Ser. No. 391,773, Aug. 10, 1989, abandoned.

[30] Foreign Application Priority Data

Aug. 11, 1988 [JP] Japan .................. 63-198789

[51] Int. Cl.$^5$ .................. G06F 9/30; G06F 9/38
[52] U.S. Cl. .................. 395/800; 364/231.8; 364/948.34
[58] Field of Search .................. 364/DIG. I, DIG. II; 395/375, 800

[56] References Cited

U.S. PATENT DOCUMENTS

| | | | |
|---|---|---|---|
| 3,918,030 | 11/1975 | Walker | 364/200 |
| 4,025,771 | 5/1977 | Lynch | 364/200 |
| 4,028,684 | 6/1977 | Divine et al. | 364/900 |
| 4,179,735 | 12/1979 | Lodi | 364/200 |
| 4,213,176 | 7/1980 | Cooper | 364/200 |
| 4,594,660 | 6/1986 | Guenthner | 364/200 |
| 4,630,195 | 12/1986 | Hester | 364/200 |
| 4,674,034 | 6/1987 | Iwashita | 364/200 |
| 4,763,246 | 8/1988 | Holt et al. | 364/200 |
| 4,766,532 | 8/1988 | Pearson et al. | 364/200 |

FOREIGN PATENT DOCUMENTS 0106670  4/1988  European Pat. Off.

OTHER PUBLICATIONS

Okamoto et al. "Design considerations for 32bit microprocessor TX3", Spring Compcon 88, San Francisco, Calif., Mar. 4, 1988, pp. 25-29.
Smith et al. "Implementation of precise interrupts in pipelined processors", The 12th Annual International Symposium on Computer Architecture, Boston, Mass., Jun. 19, 1985, pp. 36-44.
Dobbs et al., "Supercomputing on Chip," VLSI Systems Design, May 1988, pp. 24-25, 28-29, 32-33.

Primary Examiner—David Y. Eng
Attorney, Agent, or Firm—Foley & Lardner

[57] ABSTRACT

An instruction pipeline type microprocessor comprises an operation execution section consisting of a first operation execution section for executing instructions having no memory operand, a second operation execution section for executing instructions having a memory operand, and a third operation execution section for executing floating point instructions. A general purpose register is provided consisting of a second register group for storing data processed as a result of execution by the operation execution section in the form of a flow of programs and a first register group for storing processed data as the result of a look-forward execution of instructions which can be processed by the operation execution section. Compare logic determines whether or not succeeding instructions have been executed. The processed data held in the first register group is provided to the second register group so as to facilitate execution in the predetermined program order.

6 Claims, 6 Drawing Sheets

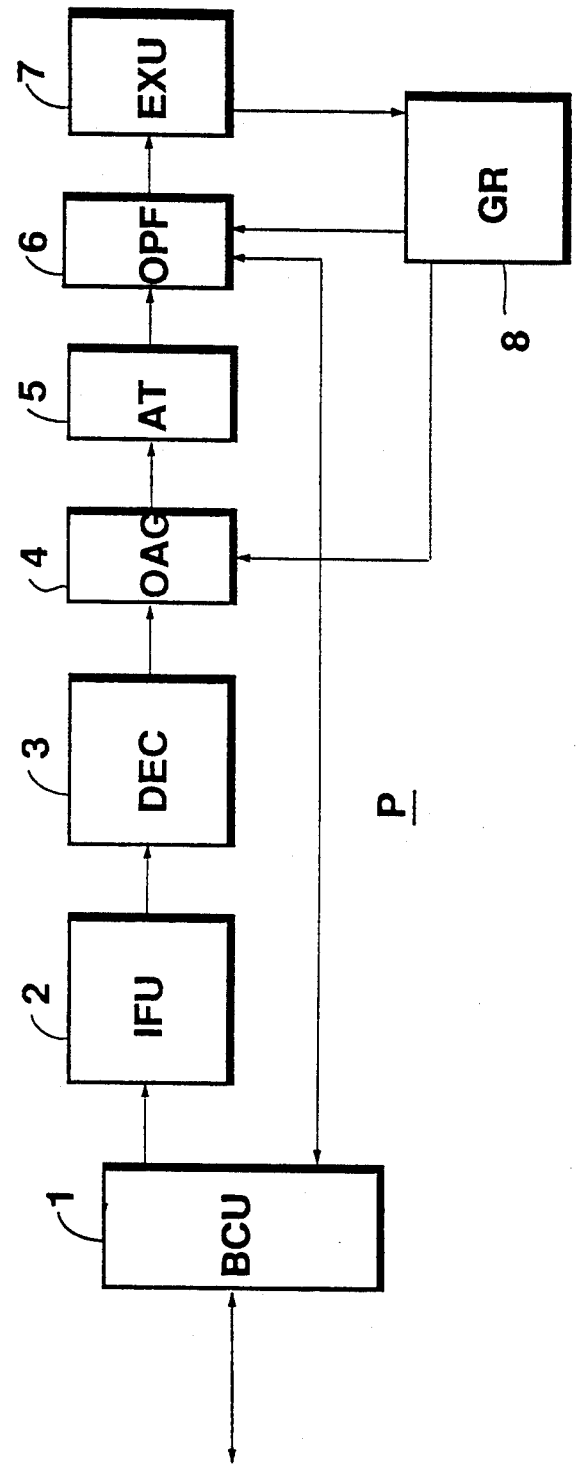

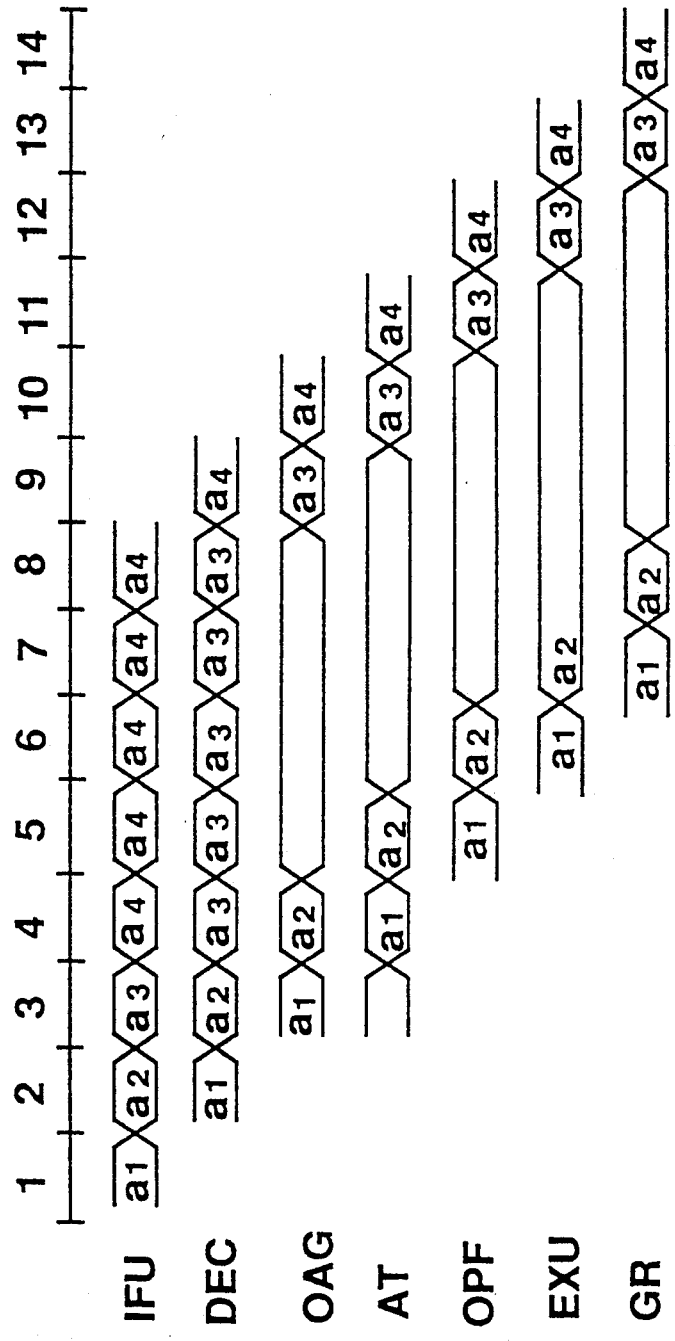

INSTRUCTION PIPELINE MICROPROCESSOR

This application is a continuation application of Ser. No. 07/391,773, filed Aug. 10, 1989, now abandoned.

BACKGROUND OF THE INVENTION

1. Field of the Invention

The present invention relates to a parallel instruction execution type microprocessor, more particularly to an instruction pipeline type microprocessor capable of rapidly executing instructions.

2. Description of the Prior Art

In the instruction pipeline type microprocessor according to the prior art, a particular register or registers are used in order to perform an operand address calculation in, for example an ADD instruction. However, as the content of the register is modified by a previous instruction such as a TRANSFER instruction, the ADD instruction can not be shifted to an operand address calculation stage before a write stage to a general purpose register is terminated, thus delaying the processing of the instruction.

Namely, FIG. 2 shows an outline construction of the instruction pipeline type microprocessor according to the prior art.

In FIG. 2, reference numeral 1 indicates a bus control section (BCU) for connecting a microprocessor P to an external circuit, numeral 2 indicates an instruction fetch section (IFU), 3 indicates a decoder (DEC) for decoding instructions, 4 an operand address calculation section (OAG), 5 an address translation section (AT) for converting a logical address into a physical address, 6 an operand fetch section (OPF) for fetching an operand, 7 an operation execution section (EXU) for executing instructions, 8 general purpose register group (GR) consisting of a plurality of registers $R_1, R_2, R_3, R_4, \ldots$ (not indicated).

When machine instructions shown in FIG. 1 are executed by the microprocessor P shown in FIG. 2 for instance, the timing of the instruction pipeline processing becomes the one shown in FIG. 3. As shown in FIGS. 1 and 3, supposing that $a_1$ is an instruction which transfers the content of an address A to the register $R_1$ (not indicated) in $GR_8$, $a_2$ is an instruction which transfers data in the register $R_3$ in $GR_8$ to the register $R_2$, $a_3$ is an ADD instruction which transfers the content of an address B which is modified by the register $R_2$ to the register $R_4$, and $a_4$ is an instruction which transfers data in the register $R_2$ to a memory indicated by address C, the content of the register $R_2$ is used by the instruction $a_3$ in order to perform an operand address calculation. However, the content of the register $R_2$ is modified by the instruction $a_2$. As a result, the instruction $a_3$ can not move to $OAG_4$ until the transfer of the instruction $a_2$ to $GR_8$ is terminated, thus delaying the processing of the instruction $a_3$.

Since the operation execution section and the general purpose register group in the microprocessor according to the prior art are not duplicated, succeeding instructions can be executed only after the instructions for updating the general purpose register group $GR_8$ have been completely executed.

Accordingly, the advantages of the pipeline system can not be utilized due to stagnation of the processing flow in the instruction pipeline type microprocessors according to the prior art.

SUMMARY OF THE INVENTION

It is therefore an object of the present invention to provide an instruction pipeline type microprocessor in which succeeding instructions can be executed in a look-forward manner without waiting for the result of the execution of preceding instructions.

For the purpose of achieving the above object, the feature of the present invention resides in an instruction pipeline type microprocessor which comprises an operation execution section consisting of a first operation execution section for executing instructions having no memory operand, a second operation execution section for executing instructions having memory operand respectively, and a third operation execution section for executing floating point instructions. A general purpose register is provided consisting of a second register group for storing data processed by the operation execution section in the form of flow of programs and a first register group for storing processed data as the result of a look-forward execution of instructions which can be processed by the operation execution section. Compare and decision means are provided for determining whether or not succeeding instructions have been executed by jumping preceding instructions and for sending processed data held in the first register group to the second register group so as to be exchanged along a program flow in accordance with the result of the determination.

Namely, the operation execution section is duplicated while the construction of the general purpose register group is duplicated by the second register group for storing processed data along the flow of the programs and a first register group for storing the processed data as a result which has been executed in a look-forward manner, whereby succeeding instructions are executed in a look-forward manner without waiting for the execution result of the preceding instructions by updating data in the general purpose register group in order that the processed data in the first register group can be formed along the program flow, thus increasing the performance of the microprocessor.

These and other objects, features and advantages of the present invention will be more apparent from the following description of a preferred embodiment, taken in conjunction with the accompanying drawings.

FIRST DESCRIPTION OF THE DRAWINGS

FIG. 1 is one example of a program for clarifying problems which the microprocessors according to the prior art have, FIG. 2 is the construction of the microprocessor of the instruction pipeline type according to the prior art, FIG. 3 illustrates a flow of instruction processing in the microprocessor shown in FIG. 2, FIG. 4 is a basic construction of the instruction pipeline type microprocessor according to the present invention, FIG. 5 illustrates a flow of instruction processing in each section constituting the microprocessor shown in FIG. 4, FIG. 6 is a detailed construction of the operation execution section and the general purpose register group shown in FIG. 4, FIG. 7 illustrates a format of each instruction register shown in FIG. 6, and FIG. 8 illustrates an input format of the register group FGR for storing the result of the instructions in the general purpose registers, processed in a look-forward manner.

DETAILED DESCRIPTION OF THE PREFERRED EMBODIMENT

Figure 4:
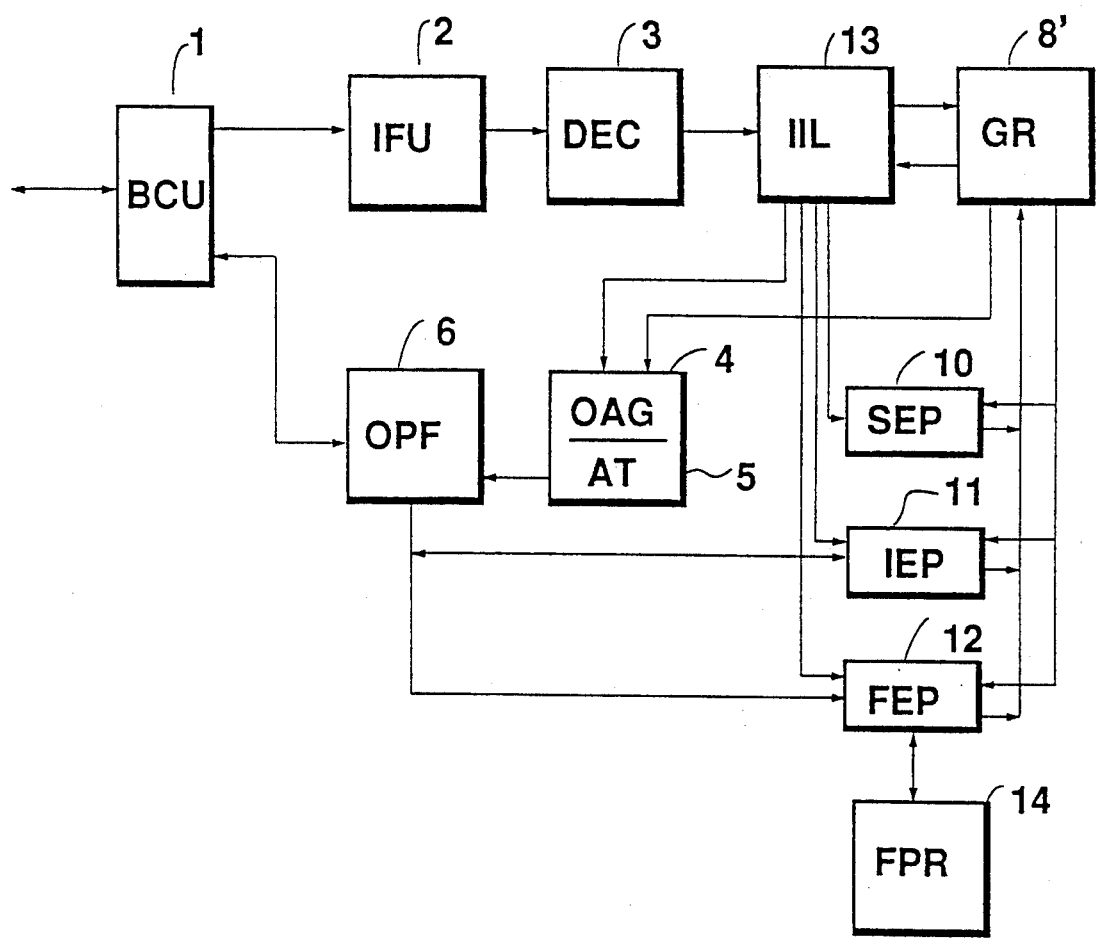

FIG. 4 shows one construction of the instruction pipeline type microprocessor according to the present invention.

In the figure, the same elements as those shown in FIG. 2 are indicated by the same reference numerals. The instruction pipeline type microprocessor comprises an operation execution section consisting of a first operation execution (SEP) 10 for executing instructions having no memory operand respectively, a second operation execution section (IEP) 11 for executing instructions having a memory operand respectively, and a third operation execution section (FEP) 12 for executing floating point instructions. In addition, reference numeral 13 indicates an instruction sending section for sending decoded instructions to each operation section and numeral 14 indicates a floating point register.

Figure 5:
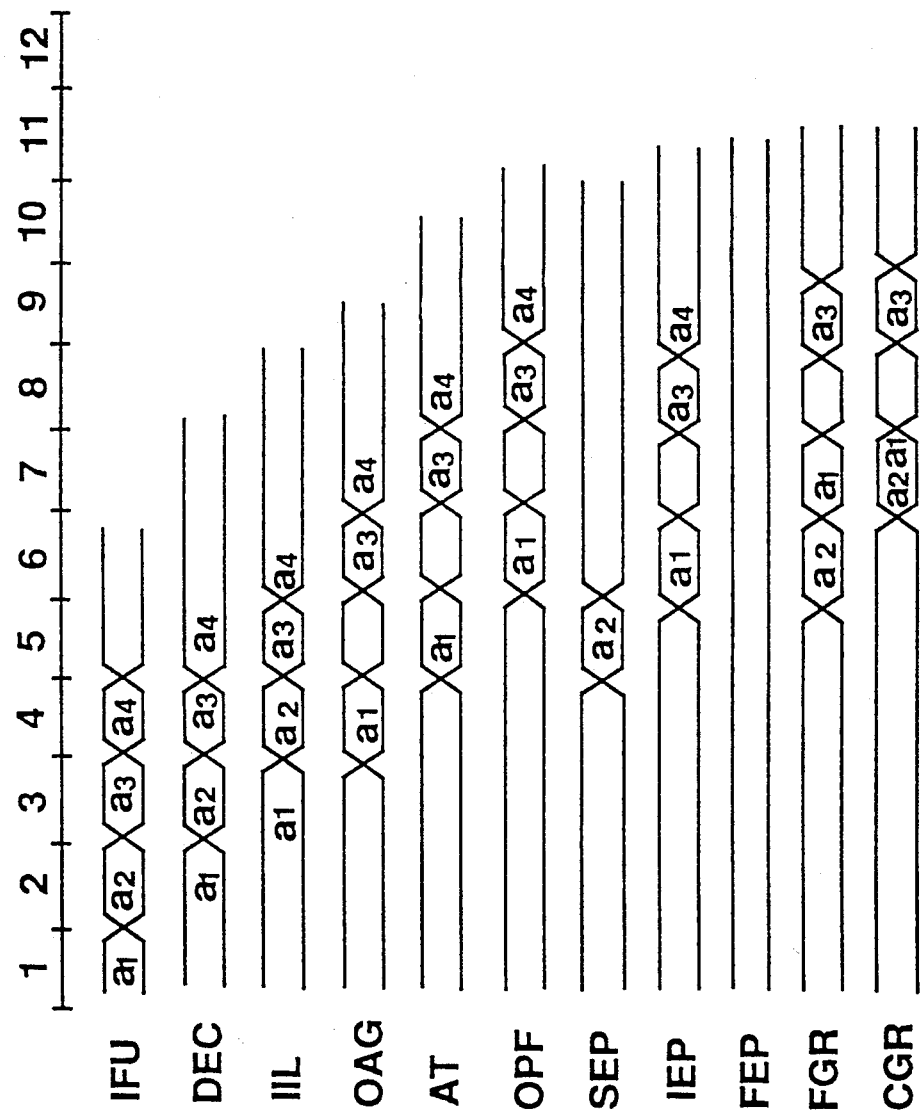

In the microprocessor according to the present invention shown in FIG. 4, the pipeline instructions shown in FIG. 4 are executed in a manner shown in FIG. 5. Namely, each instruction is fetched and processed for every clock; Instruction $a_1$ having a memory operand is processed in the order from the instruction fetch section 2→the decoder 3→the instruction issue section 13→the operand address section 4→the address translation section 5→the operand fetch section 6 to the second operation execution section 11.

Instruction $a_2$ having no memory operand but only a register operand is processed in the order from the instruction fetch section 2→the decoder 3→the instruction issue section 13 to the first operation execution section 10.

As shown in FIG. 5, since the executions of the instructions $a_2$ and $a_1$ are terminated at the fifth and sixth clocks respectively, it is necessary to avoid discrepancy between the data in the general purpose register group 8' and the program flow. To this end, the general purpose register group 8' comprises a register group for holding data resulting from program processing which will be described later and a register group for temporarily holding the execution result of instruction in the look-forward manner, i.e., the two register groups are duplicated.

Figure 6:
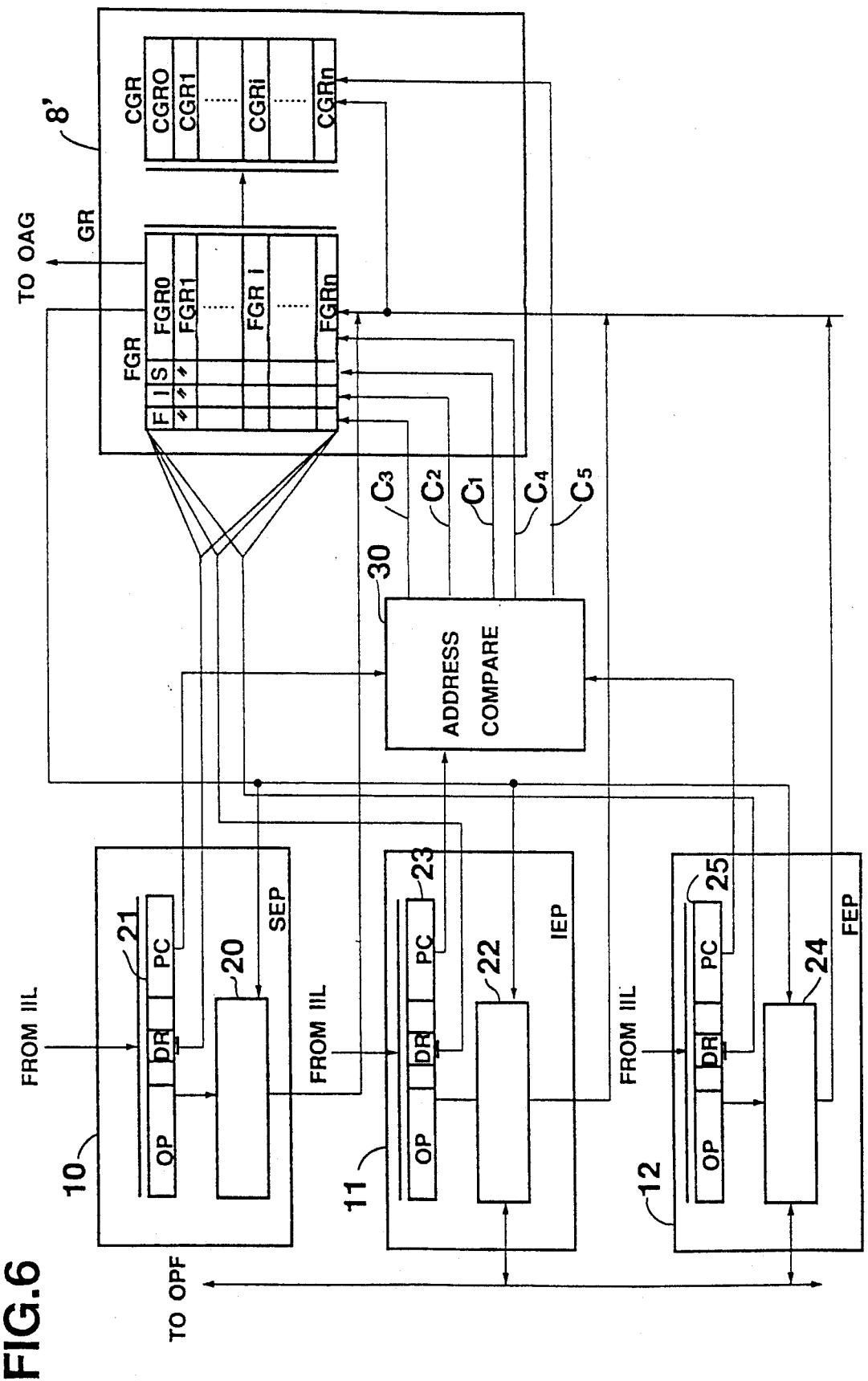

In FIG. 6, the first operation execution section 10 comprises a first operator 20 and a first instruction register 21, the second operation execution section 11 comprises a second operator 22 and a second instruction register 23, and the third operation execution section 12 comprises a third operator 24 and a third instruction register 25. Each of the instruction registers 21, 23, and 25 has an instruction format shown in FIG. 7.

Figure 7:

That is to say, in FIG. 7, OP indicates an operational function designation field of the associated operators, SR indicates a source register designation field, DR a destination register field, SA/ID a source operand address or immediate data holding field, DA a destination operand address holding field, and PC an address holding field of an instruction in execution.

Returning to FIG. 6, the general purpose register group 8' is divided into a register group $CGR_i$ (i=1, 2, 3, ... n) for storing data results processed in accordance with a program and a register group $FGR_i$ (i=1 2, 3, ... n). Moreover, in FIG. 6, reference numeral 30 indicates an instruction address compare section, which is included in the general purpose register 8'.

Figure 8:

In FIG. 8, there is shown a detailed format of the register group FGR which consists of three tag portions F, I, S each consisting of three bits and a data holding portion FGRi for holding each data.

Now, turning back to FIG. 6, each PC field of the instruction registers 21, 23, 25 is applied to the instruction address compare section 30 in order to determine whether or not a succeeding instruction is being executed by jumping a preceding instruction, for the comparisons of each PC field.

From the result of the comparison, when the PC field of the first instruction register 21 is not minimum, a "1" output signal is produced from the output $C_1$ of the compare section and when the PC field of the second instruction register 23 is not minimum, a "1" output signal is produced from the output $C_2$ thereof, while when the PC field of the instruction register 25 is not minimum, a "1" output signal is produced from the output $C_3$ thereof.

Furthermore, when the address PC of the instruction register in the operator which has executed an instruction is not minimum, a "1" output signal (FGR WRITE signal) is produced from the output $C_4$ of the address compare section 30, while when the address PC of the instruction register is minimum, a "1" output signal (CGR WRITE signal) is produced from the output $C_5$ of the compare section 30.

When the operation in each operator is terminated, the tag S in the register FGR is set at "1" when $C_4=1$, $C_1=1$, and the I tag is set at "1" when $C_2=1$, while the F tag is set at "1" when $C_3=1$.

The operation result from each of the operators 20, 22, and 24 are stored in the data holding section FGRi designated by the DR field of each of the instruction registers 21, 23, 25.

When the operation of each of the operators 20, 22, and 24 is terminated, the result of each operation is stored in the data holding section $FGR_i$ and $CGR_i$, designated by the DR field of each instruction register subject to $C_4=0$, $C_5=1$. The data in another $FGR_i$ in which any one of the tags F, I, and S has been set up, is designated in the corresponding $CGR_i$.

Accordingly, as shown in FIG. 5, in operation, the PC field of the first instruction register 21 shown in FIG. 6, contains the address of the instruction $a_2$ at the fifth clock at which time the instruction $a_2$ is to be executed and the PC field of the second instruction register 23 contains the instruction $a_1$. However, since an instruction has not been sent to the PC field of the third instruction register 25 from the instruction sending section 13, its PC field contains no address. As a result, no instruction is executed in the third operation execution section 12.

On the other hand, since the first instruction register 21 contains the instruction $a_2$ and the address PC field thereof is larger than that of the instruction $a_1$, $C_1=1$ is established and the result of the operation is written into $FGR_2$ while the tag S is set at "1".

The instruction $a_1$ is executed in the second operator 11 in the sixth clock. In this case, however, as the instruction register 21 in the first operator 10 contains no instruction because the instruction $a_2$ has already been executed therein, no action is performed. Accordingly, since $C_4=0$, $C_5=1$, the result of the operation of the instruction $a_1$ is stored in the $CGR_1$ and $FGR_1$, while the data in $FGR_2$ in which the tag $S_1$ has been set at "1"

is now transferred to CGR$_2$ and is stored for a later use as data processed along the program flow.

As will be appreciated from the above description, the data necessary for the calculation of the effective address of the next instruction a$_3$ can be picked up from the FGR$_2$ (which corresponds to the register R$_2$) at the termination of the fifth clock. As a result, the instruction a$_3$ can be moved to the effective address calculation section 4 immediately.

Accordingly, unlike the microprocessors of this type according to the prior art, in the instruction pipeline type microprocessor according to the present invention, a sequential program processing such that the instruction a$_3$ is processed only after the instructions a$_1$ and a$_2$ have been executed, is not required in the present invention.

As has been described in the foregoing, in the instruction pipeline type microprocessor according to the present invention, the operation execution section is duplicated so as to execute a plurality of instructions simultaneously, while the general purpose register group is also divided into a second register group for storing data processed along the program flow and a first register group for storing data as a result of having executed in look-forward manner, a succeeding instruction.

In the instruction pipeline type microprocessor according to the present invention, there is also provided a compare and decision means whereby a decision is made whether or not the succeeding instruction is being executed by jumping the preceding instructions and the processed data which has been held in the first register group is sent to the second register group so as to replace them in the form along the program flow in accordance with the result of the decision.

Since succeeding instructions can be executed in a look-forward manner without waiting for the result of the execution of the preceding instructions, the performance of the microprocessor of the instruction pipeline type according to the present invention can be strikingly improved.

Various modification will become possible for those skilled in the art after receiving the teachings of the present disclosure without departing from the scope thereof.

What is claimed is:

1. An instruction pipeline type microprocessor, comprising:
   (a) means for fetching, decoding and determining a plurality of different kinds of decoded instructions and sending said plurality of different kinds of decoded instructions in accordance with said determined different kinds;
   (b) a plurality of operation execution sections for receiving said decoded instruction according to said determined different kinds and respectively executing said plurality of different kinds of decoded instructions simultaneously, wherein each of said plurality of operation execution sections includes an instruction register having at least an instruction address holding field indicative of an address of an instruction decoded in a program and a destination register designation field;
   (c) first storing means for storing processed data, said data resulting from having executed in a look-forward manner, instructions capable of processing by said plurality of operation execution sections without waiting for execution results of preceding instructions, said first storing means including a plurality of tag bits;
   (d) second storing means for storing processed data resulting from execution by said operation execution sections of instructions executed in predetermined program order; and
   (e) compare means for comparing each datum from said operation execution sections in terms of a sequence in which the execution is completed and for sending, said datum being an address received from the address holding field of said each instruction register, based on the sequence of completion of the execution and the predetermined program order, the processed data directly to at least one of the second storing means and the first storing means, said processed data stored in said first storing means being transferred to said second storing means in the predetermined program order according to compare results and contents of said tag bits, wherein said compare means comprises a comparator for comparing each said datum, and for producing signals indicative of the result of the comparisons and for sending said signals to said first storing means, said tag bits being determined by said signals from the comparator.

2. The microprocessor as claimed in claim 1, wherein said plurality of operation execution sections include a first operation execution section for executing instructions having no memory operand, a second operation execution section for executing instructions having a memory operand, and a third operation execution for execution floating point instructions.

3. The microprocessor as claimed in claim 2, wherein said first storing means is comprised of register group for successively storing the results of the operations of instructions executed, and said second storing means is comprised of register group for storing the result of the operations executed in the predetermined program order.

4. An instruction pipeline type microprocessor, comprising:
   (a) means for fetching a plurality of instructions;
   (b) means for decoding said plurality of instructions;
   (c) means for determining types of a plurality of decoded instructions and for sending said decoded instructions according to a determined type;
   (d) a plurality of operation execution sections, each for executing a specific type of instruction, receiving said decoded instructions according to said determined type, said operation execution sections simultaneously executing said decoded instructions, each of said plurality of operation execution sections including an instruction register having at least an instruction address holding field indicative of an address of an instruction decoded in a program and a destination register designation field;
   (e) compare means for comparing each address of said instructions contained in each instruction address holding field of respective said operation execution sections, thereby indicating a sequence in which instruction execution is completed and outputting compare results indicating said sequence;
   (f) first storing means for storing first processed data according to a compare result that an address of one of said instructions was not a minimum, said first processed data resulting from having executed instructions in a look ahead manner;

(g) second storing means for storing second processed data according to another compare result that an address of one of said instructions was a minimum, said second processed data resulting from execution by at least one of said operation execution sections of instructions executed in predetermined program order; and (h) means for transferring said processed data stored in said first storing means to said second storing means in response to said compare results, thereby storing data in said second storing means in the predetermine program order.

5. The microprocessor as claimed in claim 4, wherein said types include a first type being instructions having no memory operand, a second type being instructions having a memory operand and a third type being floating point instructions.

6. A method for executing instructions in an instruction pipeline type microprocessor, comprising the steps of:

(a) fetching, decoding and determining a plurality of different kinds of instructions and supplying said instructions in accordance with the respective different kinds;

(b) receiving and executing said plurality of different kinds of decoded instructions in a plurality of operation execution sections, said decoded instructions received in accordance with the respective different kinds of instructions, each of said plurality of operation execution sections including an instruction register having at least an instruction address holding field indicative of an address of an instruction decoded in a program and a destination register designation field;

(c) executing in a look-forward manner, instructions capable of processing by said plurality of operation execution sections without waiting for execution results of preceding instructions to produce first processed data;

(d) storing said first processed data in a first storing means, wherein said first storing means includes a plurality of tag bits, said tag bits being determined by said signals from the comparator.

(e) executing instructions by said operation execution sections in predetermined program order and generating second processed data;

(f) storing second processed data in a second storing means;

(g) comparing each datum from said operation execution sections in terms of a sequence in which the execution is completed and providing compare results;

(h) sending, based on compare results and the predetermined program order, the processed data directly to one of the second storing means and the first storing means; and (i) transferring said processed data stored in said first storing means to said second storing means in the predetermined program order according to said tag bits and said compare results.

* * * * *